United States Patent [19]
Rode

[11] 3,751,048
[45] Aug. 7, 1973

[54] SEAL ELEMENT
[75] Inventor: John E. Rode, Fonda, N.Y.
[73] Assignee: Temper Corporation, Fonda, N.Y.
[22] Filed: June 2, 1972
[21] Appl. No.: 259,124

[52] U.S. Cl. .............................................. 277/200
[51] Int. Cl. ............................................. F16j 15/08
[58] Field of Search .................... 277/138, 139, 140, 277/200, 213, 225

[56] References Cited
UNITED STATES PATENTS
| | | | |
|---|---|---|---|
| 2,291,945 | 8/1942 | Bowers | 277/200 |
| 2,466,474 | 4/1949 | Phillips | 277/200 |
| 2,638,393 | 5/1953 | Phillips | 277/213 |
| 3,240,501 | 3/1966 | Smith | 277/213 |

Primary Examiner—Herbert F. Ross
Assistant Examiner—Robert I. Smith
Attorney—Melvin A. Crosby

[57] ABSTRACT

A seal element in the form of a convoluted tubular member formed of a resilient ductile metal which work hardens when stressed beyond the elastic limit. The seal element at the ends has shoulders formed at the juncture of axial and radial flanges which define annular seal regions that can create a high stress region when the seal element is compressed between opposed parts.

11 Claims, 7 Drawing Figures

3,751,048

SEAL ELEMENT

The present invention relates to a metallic sealing ring and, in particular, to an axially compressible metallic sealing ring that presents substantially constant resistance to compression over a substantial axial range of compressibility and which has at least one extremely well defined annular sealing region thereon.

Metallic sealing rings are known, including axially compressible metallic sealing rings. Such rings are highly useful, particularly, where high temperatures and corrosive conditions are encountered. Metallic sealing rings are also well adapted for confining high pressures. Still further, metallic sealing rings of the nature referred to are relatively inexpensive and can be fabricated to substantially any size desired.

A particular object of the present invention is the provision of an improved metallic sealing ring of the nature referred to which has at least one extremely well defined annular sealing region thereon of predetermined extend which will effect reliable sealing engagement with a part against which it is pressed.

A further object of the present invention is the provision of a sealing ring of the nature referred to which can be fabricated relatively simply and inexpensively.

Still another object of the present invention is the provision of a metallic sealing ring of the nature referred to which will reliably seal against a metallic surface even when there are minor imperfections in the said surface.

A particular object of the present invention is the provision of a metallic sealing ring which permits a substantial degree of manufacturing tolerance in the parts which it engages without seriously effecting the sealing capabilities of the sealing ring.

The foregoing objects as well as still other objects and advantages of the present invention will become more apparent upon reference to the following detailed specification taken in connection with the accompanying drawings in which.

BRIEF SUMMARY OF THE INVENTION

According to the present invention, a metallic sealing ring is formed which is convoluted in cross section from end to end and which has an offset region on each end forming a sharply defined annular seal region. Each seal region is in the form of a shoulder formed at the juncture of a short axial flange and a radial flange on each end of the ring and can be made relatively sharp by forming techniques and can be made even sharper by grinding or polishing the radial flange.

The ring is formed from a relatively thin strip of metal which is formed to an endless ring and which is convoluted in the axial direction. The convolutions take the form of a plurality of curvilinear sections, or convolutions, arranged in end to end relation. The metal from which the ring is made is resilient and ductile and has the characteristic of work hardening when stressed beyond the elastic limit so that when the ring is compressed in the axial direction, it progressively work hardens from end to end in the axial direction thereof and thereby presents a substantially constant resistance to axial deformation.

The aforementioned characteristic provides for predictable and substantially constant sealing conditions at the ends of the ring over a wide range of degrees of axial compression thereof.

Suitable materials to use in the forming of the ring include hardenable stainless steels and Inconel X and the like. Other metals which are resilient and ductile and which can be annealed after the forming of the ring, and which have the characteristic of work hardening when stressed beyond the elastic limit can also be employed.

Figure 1:
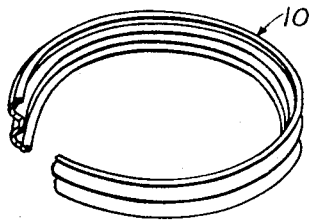
FIG. 1 is a schematic perspective view showing a sealing ring according to the present invention.

DETAILED DESCRIPTION OF THE INVENTION:

Referring to the drawings somewhat more in detail, in FIG. 1, ring 10 according to the present invention, is adapted for being placed between a pair of parts, preferably planar, which are to be sealed together. As will be seen in FIG. 2, ring 10 is convoluted and comprises a plurality of curvilinear portions in end to end relation.

Figure 2:
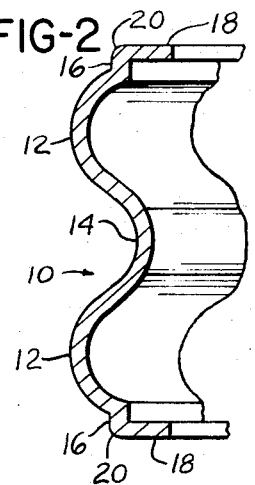
FIG. 2 is an axial cross section through one side of the ring drawn at greatly enlarged scale.

In FIG. 2, the axially outermost curvilinear portions 12 are concave toward the center of the ring and the intermediate convolution 14 is curvilinear toward the outside of the ring. Three curvilinear portions have been shown as making up the axial length of the ring but the particular number of such portions formed in the axial length of the ring and the particular size thereof is subject to wide variation. Each curved portion is about 90° in extent, measured on the concave side.

The outer side of the end ones of the convolutions are offset axially outwardly by forming thereon the relatively short axial flanges 16 and by forming at the outer ends of the axial flanges the radially inwardly extending radial flanges 18. The corners 20 formed at the juncture of the axial and radial flanges define the sealing region for the seal ring.

The ring of FIG. 2 has the corners 20 at the center of loading of the ring whereby the corners 20 form the only contact with parts between which the ring is confined until the ring is completely collapsed in the axial direction.

Figure 4:
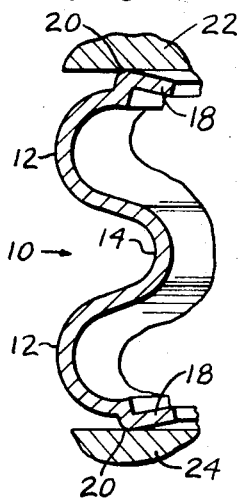
FIG. 4 shows the ring of FIG. 2 in compressed sealing condition between a pair of parts to be sealed.

As will be seen in FIG. 4, when the ring of FIG. 2 is compressed between the opposed parts 22 and 24, the radial flanges 18 bend axially inwardly somewhat so that the corners 20 engage the parts and will remain in engagement therewith through continued axial compression of the sealing ring. The corners 20 thus form well defined sealing regions which will produce predictable sealing results and which will also penetrate into parts 22 and 24, especially, when these parts are made of a softer material than the material of the seal element. In any case, there is a concentration of stress where the corners, or shoulders, engage the confining parts which creates effective sealing conditions.

Figure 3:
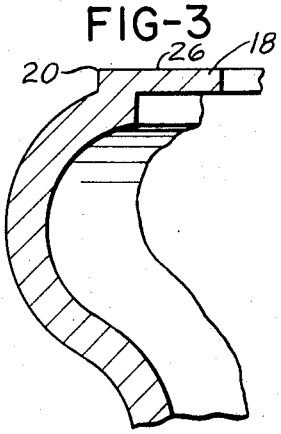
FIG. 3 is a view like FIG. 2, but shows a somewhat modified form of the ring.

As will be seen in FIG. 3, the radial flanges 18 may have the outer sides thereof ground off, or flat polished, as at 26 so that the corners, or shoulders, 20 forming the sealing regions are made sharp and will readily penetrate into the parts which the seal engages.

Corners, or shoulders, 20 can be rather well defined by roll forming the seal ring between properly formed rolls but for the ultimate in sharpness, the flanges 18 are ground off at 26 as shown in FIG. 3.

The ring of FIG. 2, which is drawn to scale, is formed by 0.015 inch thick strip and is about 0.27 inches in height and measures about 0.075 inches radially on each side. The convolutions are 0.075 inches apart on center and each radial flange is about 0.030 inches long. The shoulders are formed to present radii of about 0.015 inches to the outside.

Figure 5:
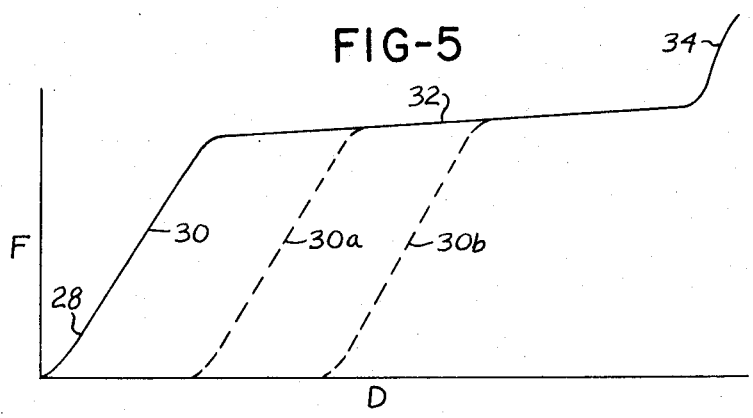
FIG. 5 is a graph showing the load-deflection curve for a ring according to the present invention.

The load-deflection curve of the sealing ring according to the present invention is shown in FIG. 5, wherein the ordinate represents the load and is indicated by F, for force, while the deflection, represented by D, is plotted as the abscissa. In FIG. 5 it will be seen that there is a first range of resilient deflection, indicated by line 28, wherein the flanges 18 bend inwardly somewhat while the entire seal ring and the parts 22 and 24 engage is compressed in the axial direction.

After a certain amount of axial deflection, the ring commences to be stressed beyond the elastic limit and thereafter plastic deformation of the ring will take place along the slightly upwardly inclined line 32 until the convolutions of the ring are substantially completely collapsed whereupon the force required for further deformation of the ring rises sharply, as indicated by line 34. The seal ring when fully collapsed is defective as a seal because of distortion of the ribs and convolutions.

As to the substantially constant load characteristics of the ring, as the ring is axially compressed between parts 22 and 24, a certain axial region thereof extending annularly of the ring will be the first to work harden and thereafter work hardening will progress axially of the ring with continued deformation thereof until the ring is substantially fully collapsed.

The ring in being collapsible under substantially a constant force maintains substantially the same load on the well defined sealing regions at the ends throughout the range of compression of the ring during plastic deformation thereof. Thus, the parts 22 and 24, which are secured together in a manner not shown, need not be manufactured with extremely close tolerances.

The ring will accommodate itself to rather wide variations in size and, with the well defined fairly sharp sealing region on each end of the ring, imperfections and roughness in the surfaces of parts 22 and 24 are compensated because the sealing regions of the ring will create the aforementioned high stress conditions which will establish good sealing conditions. The shoulders, on the outside, have a radius of about 0.015 inches.

Figure 6:
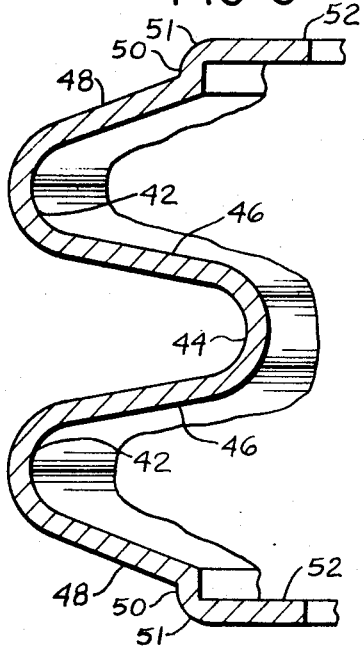
FIG. 6 shows a modified form which the ring can take.

FIG. 6 shows a modification of the sealing ring according to the present invention which is especially adapted for exerting somewhat reduced sealing pressure at the sealing region. In FIG. 6, the ring 40 is formed of relatively sharp inwardly concave curved portions 42 and a relatively sharp outwardly facing curved portion 44 with substantially linear leg portions 46 interconnecting the curved portions and forming together therewith the convolutions of the sealing body. The curved portions, on the concave side extend over about 135°.

The ring of FIG. 6, which is drawn to scale is about 0.125 inches in radial extent at each side with the center to center distance between adjacent convolutions being about 0.058 inches. The overall height of the ring is about 0.240 inches and the radial flanges 52 are about 0.040 inches long. The strip from which the ring is formed is 0.065 inches thick.

Other substantially linear leg portions 48 extend outwardly from the axially outer sides of the curved portions 42. Each of the outer legs 48 is formed with an axially outwardly extending short flange 50 from the end of which extends a substantially radial flange 52. The junctures 51 between flanges 50 and 52 form the corners, or shoulders, which form the sealing regions for the sealing ring.

Figure 7:
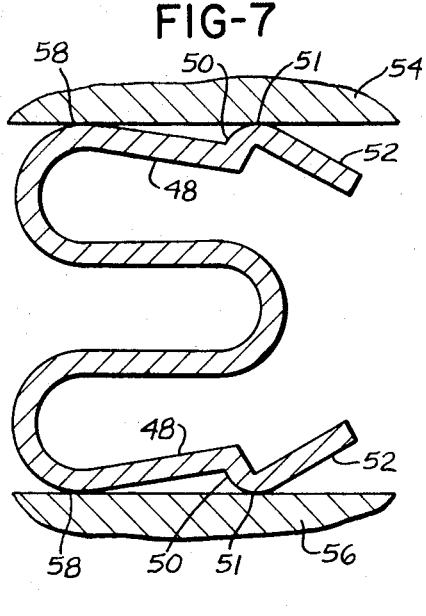
FIG. 7 shows the ring of FIG. 6 in a condition of confinement between opposed parts.

In the ring of FIG. 6, the sealing regions are displaced radially inwardly from the load center of the ring and, when the ring is compressed, the confining parts may take two points, or annular regions of bearing at each end of the ring, as shown in FIG. 7.

In the ring of FIG. 6, the initial compression thereof will cause legs 48 to flex and the shoulders 51 at the junctures of flanges 50 and 52 will be presented to the parts between which the ring is being compressed to form the well-defined lightly stressed sealing regions the same as occurs with shoulders 20 in connection with the first described modification.

In FIG. 7, the confining parts, 54 and 56 can engage the ring at regions 58 at a certain point during compression of the ring but the major force is still developed at shoulders 50.

Due to the relatively long substantially linear legs interconnecting the curved portions of the body of the seal ring, the seal ring can be axially compressed a substantial distance without developing extremely high pressures on the sealing regions.

The seal ring of FIG. 6 can be compressed to the point that plastic deformation of the body of the seal ring commences, the same as has been described in connection with the previous modifications, but it can also be used entirely within the limit of the elastic compressibility thereof and will still present sharply defined annular sealing regions of limited area to the parts which it engages.

The graph of FIG. 5 is representative of both of the sealing rings illustrated in that lines 30a and 30b, representing expansion of the ring when released from respective compressed conditions, are parallel to line 30 representing the initial resilient compression of the ring prior to plastic compression thereof.

Modifications may be made within the scope of the appended claims.

What is claimed is:

1. A ring adapted for sealing engagement with a pair of opposed planar members between which the ring is compressed and engaging said members with a substantially constant force over a wide range of axial compression of said ring; said ring comprising an endless strip of relatively thin resilient ductile metal, said strip in axial cross section being convoluted and comprising a plurality of convolutions in end to end relation, axial flanges projecting from the axially outermost sides of the end ones of said convolutions of said ring, and radial flanges on the outer ends of said axial flanges.

2. A ring according to claim 1 in which each said convolution comprises a curved region and said axial flanges are disposed in the radial direction within the radial range of the curved regions of the adjacent ones of said convolutions.

3. A ring according to claim 2 in which said axial flanges are disposed substantially on the load line of said ring.

4. A ring according to claim 1 in which each said convolution comprises a curved region and said axial flanges are disposed in the radial direction outside the radial range of the curved regions of the adjacent ones of said convolutions.

5. A ring according to claim 1 which includes a sharp corner at the juncture of said axial and radial flanges on the axially outer sides of said flanges.

6. A ring according to claim 2 in which said convolutions when viewed in cross section present a continuously curvilinear configuration in axial cross section from one said axial flange to the other.

7. A ring according to claim 5 in which each convolution when viewed in axial cross section extends over a range of about 90°.

8. A ring according to claim 4 in which each convolution when viewed in axial cross section comprises a central curved portion and inclined leg portions connecting the said curved portions.

9. A ring according to claim 8 in which said leg portions are substantially linear.

10. A ring according to claim 1 in which said radial flanges are smooth finished on the axially outer sides and the shoulder formed at the juncture of said radial and axial flanges is thereby made sharp.

11. A ring according to claim 1 in which said ring is formed by a material which work hardens.

* * * * *